United States Patent [19]

Masters

[11] Patent Number: 5,216,616
[45] Date of Patent: Jun. 1, 1993

[54] SYSTEM AND METHOD FOR COMPUTER AUTOMATED MANUFACTURE WITH REDUCED OBJECT SHAPE DISTORTION

[76] Inventor: William E. Masters, 313 Dogwood La., Easley, S.C. 29640

[21] Appl. No.: 444,529

[22] Filed: Dec. 1, 1989

Related U.S. Application Data

[63] Continuation-in-part of Ser. No. 371,084, Jun. 26, 1989, Pat. No. 5,134,569.

[51] Int. Cl.$^5$ ............... G06F 15/46; B28B 17/00; B28B 1/14; B27G 11/02
[52] U.S. Cl. .................... 364/474.24; 364/468; 156/379.6; 156/59; 156/272.8; 264/308; 425/162; 425/174
[58] Field of Search ............... 364/474.24, 468–469, 364/473, 477; 156/379.6, 59, 272.8, 244.11; 264/22, 308, 309, 211.13, 211.12, 219; 219/121.73; 425/162, 174, 174.4; 365/119, 111

[56] References Cited

U.S. PATENT DOCUMENTS

| | | | |
|---|---|---|---|
| 4,078,229 | 3/1978 | Swanson et al. | 365/11 |
| 4,238,840 | 12/1980 | Swainson | 365/119 |
| 4,247,508 | 1/1981 | Housholder | 264/308 |
| 4,575,330 | 3/1986 | Hull | 364/473 |
| 4,665,492 | 5/1987 | Masters | 364/474.24 |
| 4,710,253 | 12/1987 | Soszek | 156/272.8 |
| 4,749,347 | 6/1988 | Valavaara | 425/162 |
| 4,752,352 | 6/1988 | Feygin | 156/272.8 |
| 4,915,757 | 4/1990 | Rando | 156/59 |
| 4,943,928 | 7/1990 | Campbell et al. | 364/477 |
| 4,961,154 | 10/1990 | Pomerantz et al. | 425/174.4 |
| 4,977,511 | 12/1990 | Crattschalk et al. | 364/473 |
| 5,031,120 | 7/1991 | Pomerantz et al. | 364/468 |
| 5,121,329 | 6/1992 | Crump | 364/468 |
| 5,136,515 | 8/1992 | Helinski | 364/474.05 |

*Primary Examiner*—Jerry Smith
*Assistant Examiner*—Jim Trammell
*Attorney, Agent, or Firm*—Bell, Seltzer, Park & Gibson

[57] ABSTRACT

A system and method for producing a three-dimensional object (10, 70) from coordinates generated on a computer machine (12) is disclosed wherein the object has improved dimensional accuracy. Control signals (20b) are generated for controlling a servo (20) that controls a reaction or interaction of material (20a) at the coordinate points to form the object while a second servo (22) serves to build up a three-dimensional support system (42) in response to support control signals (22b). Support control signals (22b) are generated at the same time the coordinate points of the design are generated to specify strategic points of the object at which a support environment need be placed in order to insure the dimensional accuracy of the object avoiding warpage or other dimensional distortion. As a support environment, a series of webs (50, 52, 54) or columns (76), or encapsulation (44, 92) may be provided for providing a support environment for the object.

26 Claims, 5 Drawing Sheets

SYSTEM AND METHOD FOR COMPUTER AUTOMATED MANUFACTURE WITH REDUCED OBJECT SHAPE DISTORTION

This is a continuation-in-part of Ser. No. 371,084, filed on Jun. 26, 1989, entitled SYSTEM AND METHOD FOR COMPUTER AUTOMATED MANUFACTURING USING FLUENT MATERIAL, U.S. Pat. No. 5,134,569.

BACKGROUND OF THE INVENTION

The invention relates to the automated manufacturing of a three-dimensional object whose design has been created with a computer aided design (CAD) machine, and, in particular to such manufacture with reduced warpage and dimensional distortion in the object shape.

Modern day manufacturing has created a considerable need for flexibility in the manufacturing process. Several systems and methods for manufacturing three-dimensional objects, which have been designed on a computer, have been proposed. However, turning a computer aided design into a solid three-dimensional object quickly and inexpensively remains a problem to which considerable attention need be given.

Technology, commonly referred to as direct cad manufacturing (DCM), has been rapidly developing. In desk top manufacturing, a three-dimensional object is created on a computer screen using a CAD program. Any physical product that is designed, shaped, or prototyped prior to production could benefit from DCM. Industries that may use DCM include automotive, aerospace, appliance, toy manufacturers, and any process that involves the design, redesign, prototyping, and production of three-dimensional models, molds, patterns, or short production runs. Designs that once required weeks or months to be turned into actual models or prototypes can become objects in a matter of hours or days using DCM. Using DCM, a design can be recalled from a library and the object manufactured in just a short period of time, thus eliminating the need for large inventories. Basically, there are five identifiable desk top manufacturing systems and methods.

First is ballistics particle manufacturing as disclosed in U.S. Pat. No. 4,665,492. In this system, the coordinates of a three-dimensional design are stored in a computer data base. Particles are directed to specific locations and built up and deposited to construct the desired object. Second, in photochemical machining, shapes are formed by the polymerization of a monomer, or by sculpting a solid block of plastic, for example, see U.S. Pat. Nos. 4,078,229; 4,238,840; and 4,571,377. In polymerization, one laser may pump a photo initiator or photosynthesizer, while a second laser pumps energy. Polymerization takes place where the two beams intersect. When using the other sculpting technique, a block of rigid plastic is carved by degrading material at the intersection of the two beams. Third is laminated object manufacturing where objects are constructed by the successive deposition of thin layers of powdered plastics or metals, thin layers of powder are deposited, then compressed with a heated press platform or by roller compression. Pulses from a single laser then sinter or melt the powder in the desired cross-sectional shape and to the required depth. An example of this type system can be seen in U.S. Pat. No. 4,752,352. Fourth is selective laser sintering where objects may be fabricated by the successive deposition and sintering of thin layers of powdered material, either plastic or metal. The powder layers are spread by a feeding mechanism, but are not compressed. Sintering energy can come from a laser or other suitable direct beam of energy. Fifth, stereolithography is a form of stereolithographic printing wherein a single laser beam cures successive thin layers of liquid monomer by a series of controlled photopolymerization reactions such as shown in U.S. Pat. No. 4,575,330.

Further, U.S. Pat. No. 4,749,347 discloses a topology fabrication apparatus in which a three-dimensional solid body having a predetermined topography is automatically manufactured using an extrusion process. Thin sections of the solid body are extruded and successively built up next to each other to form the topographical form such as a topology model made from topographical map information. This system requires a fairly sophisticated apparatus and control for forming what is a relatively simple form. The types of objects which can be made with such an apparatus and control are relatively limited.

In some of the above methods and systems, the ability to form an accurate object is limited by the mechanical system employed. For example, as an object is formed and cured, there may be some shrinkage or warpage which cause the object to warp, depending on the method or system employed. In the field of desk top manufacturing or computer aided manufacturing, the formation of an accurate object without inherent warpage, or other distortion, is a problem to which considerable attention need be given.

Accordingly, an important object of the present invention is to provide a method and system for the computer aided manufacture of three-dimensional objects in which warpage or other distortion of the object is reduced.

Another object of the present invention is to provide a system and method for automatically manufacturing three-dimensional objects whose design has been created on a CAD machine in which the object is mechanically supported during the manufacturing process to reduce warpage, or other distortion of the object during formation.

SUMMARY OF THE INVENTION

The above Objectives are accomplished in accordance with the present invention by forming a three-dimensional object designed on a computer machine by generating control signals specifying the coordinate points of the object, and controlling a reaction or interaction of a material at the coordinate points to form the object in response to the control signals. Support control signals are generated specifying strategic points on the object which need to be physically supported during formation to prevent warpage or other dimensional distortion of the object. While the object is being formed, a three-dimensional support system is formed in response to the support control signals so that the object is physically supported at the strategic points during formation and a dimensionally accurate object is formed. In a preferred embodiment, the object is formed either by ballistic particles or by extruding a continuous strand of material while the three-dimensional support environment is formed of a support material by particle ballistics or strand extrusion. The three-dimensional support system may be constructed as an encapsulation about the object while it is being formed, support webs physically supporting the object at strategic points, or columns supporting the objects at strategic points, either internally or externally of the object, depending upon the shape or application being made.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
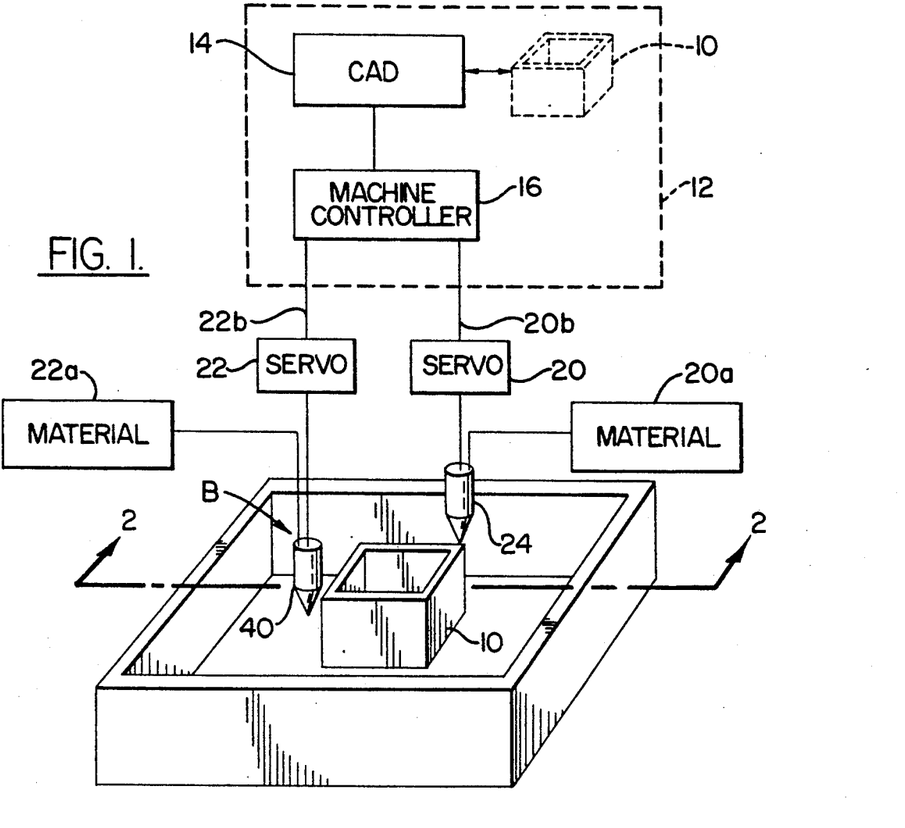
FIG. 1 is a perspective view illustrating a system and method for producing a three-dimensional object from a three-dimensional design created on a computer machine with a three-dimensional support environment to provide increased dimensional accuracy in accordance with the invention.

Referring now in more detail to the drawings, an object 10 in the form of a rectangular open-top box is illustrated in FIG. 1 which has been designed by a computer system 12 which includes a computer machine 14 which designs object 10 by instructions from a draftsman or designer, etc. Computer machine 14 may be any suitable machine such as a computer aided design (CAD) machine. In the conventional CAD machine, a designer uses a natural dialogue to talk to the computer machine by way of a data tablet, keyboard, etc. The machine is instructed to create, scale, rotate, modify, and/or label various elements of the design or drawing. The CAD machine answers by interpreting the instructions, encompassing what it was directed to do, displaying the results on the terminal CRT screen, and compiling a data file specifying the coordinate points of the design produced and displayed. When the drafting and design effort is complete, the data file containing the coordinate information of the three-dimensional design may be stored on the hard disk or other computer storage media for archive purposes, and later reproduction of the object.

In accordance with the invention, the data file, which may be in the form of coded binary information is transferred to a machine controller 16 which sends signals to a pair of servos 20, 22 for dispensing materials from sources 20a, 22a, respectively. The control of servo means 20, 22 may be had in a conventional manner such as in those devices commonly referred to as computer aided manufacture (CAM) machines. Machine controller 14 which designs the part and the machine controller 16 which controls the servos in response to the data file of three-dimensional coordinate points may be any suitable CAD and CAM machines. Alternately, computer system 12 may include an integrated computer machine which incorporates the functions of both the CAD and CAM controller.

Figure 9:
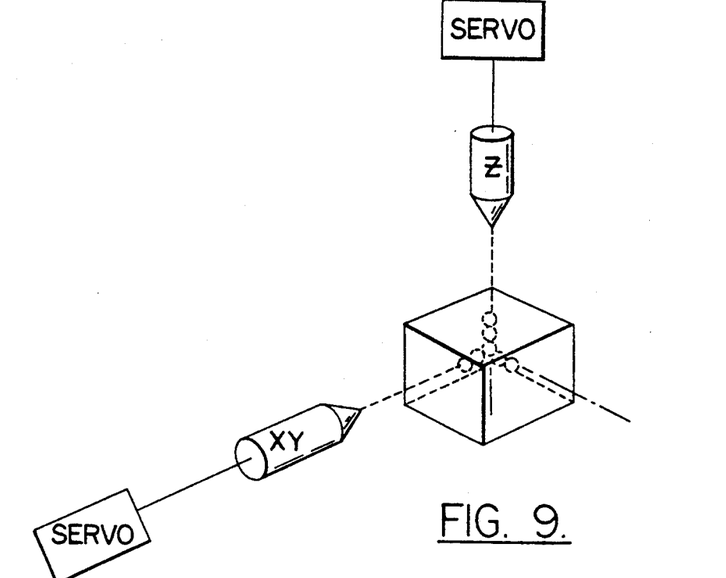
FIG. 9 is a perspective view illustrating forming a three-dimensional object, and/or a three-dimensional support system using an energy beam to direct mass particles in accordance with the method and system of the present invention.
Figure 10:
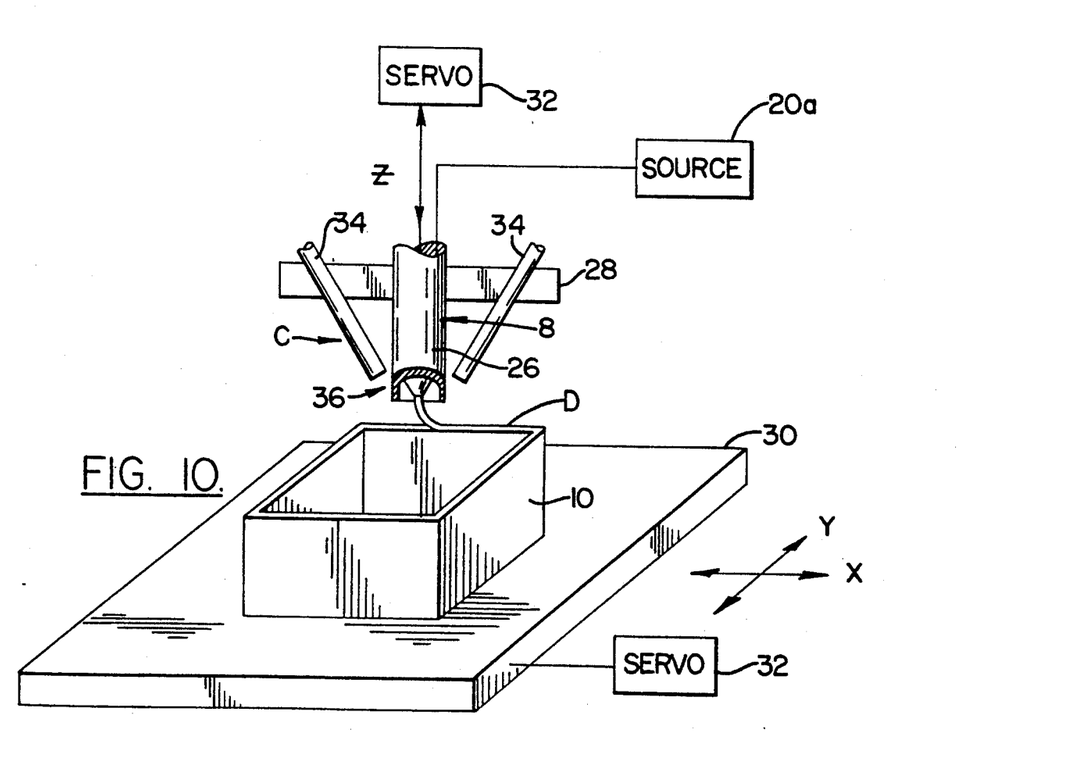
FIG. 10 is a perspective view illustrating forming a three-dimensional object, and/or support environment by dispensing a continuous strand and treating the strand to set the material in accordance with the method and system of the present invention.

Servo means 20 controls at least one working head 24 which may direct mass particles such as disclosed in U.S. Pat. No. 4,665,492 for forming object 10 (FIG. 9). Alternately, working head 24 may be an extrusion head for dispensing a continuous strand of material to form object 10 (FIG. 10). It is to be understood, of course, that a number of working heads may be utilized to form the object, regardless of whether ballistic particles or a continuous strand is used, depending upon the type of servo arrangement and application being made. As illustrated, servo 20 moves working head 24 in opposing directions along an XYZ coordinate system.

In accordance with object formation using a continuous strand of material 20a, an arrangement as can best be seen in FIG. 10 may be utilized. There is a material dispensing means B which includes an extrusion head 26. Extrusion head 26 is carried on a servo linkage 28 and moved in a vertical direction Z while a platform or base 30 upon which object 10 is formed is moved in the XY plane by a servo 32. Also carried on servo link 28 is a material treatment means C. One suitable servo apparatus for controlling the servo functions thus described is a servo machine manufactured by Rolland, Inc. and sold under the designation of Model No. CADD3. The material contained in source 20a may be pressurized for dispensing through the extrusion head 26. A suitable material is a resin manufactured under the designation "Litetak 375" which is commercially available from the Locktite Corporation of Newington, Conn. This is a polymer material which can be hardened or set with an energy beam of ultraviolet light. In this case, material treatment means C may emit a radiation energy beam in the form of ultraviolet light. In this case, a plurality of light tubes 34 may be provided and equal angularly spaced about the extrusion head 26 so as to uniformly set the material as it leaves the extrusion head. A suitable source of ultraviolet radiation or light may be used such as a Model No. ZETA 7000 ultraviolet light manufactured by Locktite Corporation of Newington, Connecticut. Other types of material and treatments for the material may be utilized in accordance with the present invention such as mixing of two chemical compositions mixed internally or externally upon dispensing. Heat, laser, or other radiation energy may also be utilized to set the fluid material upon being dispensed. A shield means 36 is provided for shielding extrusion head 26 so that the material is subjected to the radiation energy at the proper time and position to cause effective setting of the material. This is particularly important when the material is extruded in the form of a continuous strand built up in layers. Setting of the layers at the proper position and time is important for the accurate and reliable construction of the three-dimensional object. Shield 36 may be a cylindrical shield, as can best be seen in FIG. 10. The surface of base 30 may also be blackened to avoid reflection of ultraviolet light and interaction with the setting of the material as it is dispensed. Servo 32 may be controlled to index platform in the XY direction and the dispensing head B in the Z direction to form a dimensionally accurate object based on control signals specifying the coordinate points of the design as generated by machine controller 16. The orifice of the extrusion head may be selected so that strand D has a prescribed cross-sectional profile depending on the object and application being made. By controlling the index step, cross-sectional profile, extrusion to cure time, a dimensionally accurate object may be had in accordance with the invention. The smoothness of the object may be controlled by varying indexing and gap between the layers. Alternately, as can best be seen in FIG. 9, the objection may be formed by ballistic particles as disclosed in applicant's U.S. Pat. No. 4,665,492; which is incorporated in the present application by reference. Other suitable fluid material such as a plaster, ceramic, and metallic, may also be utilized.

Support means, designated generally as F is provided for forming a three-dimensional support environment about object 10 as it is being constructed. Support means F may include a second working head 40 controlled by servo 22 and dispensed material from source 22a. Material from source 22a may be the same or different material than that of 20a. Preferably the material from source 22a is different and can be any suitable material which may be dissolved, melted, or knocked away from the material forming object 10 after formation of the object. The support material may be formed about a core material, and left intact as the core material is melted, etc. This produces a mold or cavity from the remaining support material. As described above, working head 40 may form the three-dimensional support environment using any suitable method or system. Preferably, the ballistics or continuous strand method and system described above is employed.

Figure 2:
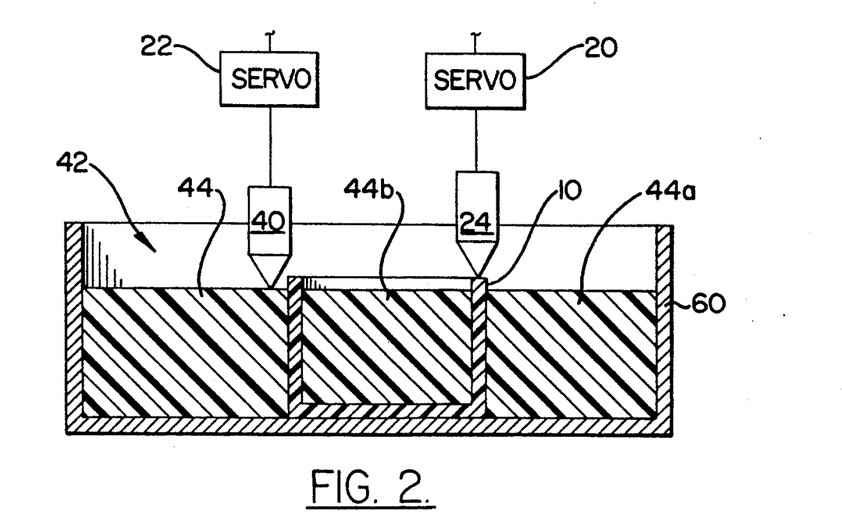
FIG. 2 is a sectional view along line 2—2 of FIG. 1.

As can best be seen in FIG. 2, a three-dimensional support environment designated generally as 42 is illustrated which includes an encapsulation 44 of support material of source 22a. Encapsulation 44 includes support material 44a surrounding an exterior of object 10 and support material 44b which fills the interior of object 10. This material may be deposited either by ballistic particles or continuous strand or flooding of the chamber, as described above. In either case, object 10 and support environment 42 are formed in a step-wise manner and at the same time in response to the respective control signals 20b and support control signals 22b.

Figure 3:
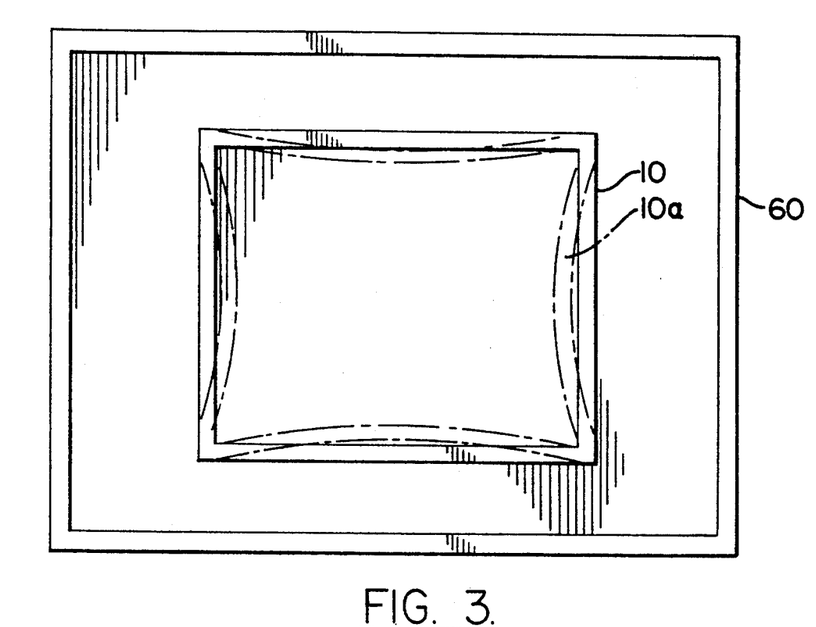
FIG. 3 is a top plan view illustrating an object such as a rectangular box being formed in accordance with the system and method of the present invention to reduce warpage and dimensional distortion.

As can best be seen in FIG. 3, object 10 is illustrated in a broken-line position 10a to illustrate possible warpage of the object 10 that could occur during shrinkage of material 20a as the part cures, i.e. turns from a liquid to a solid. It may either shrink or expand during the curing process resulting in dimensional distortion. For purposes of the present invention, the term dimensional distortion is meant to include shrinkage, expansion, or any other inaccuracy in the shape of the object as designed. As object 10 cures, the sharp corners remain rigid, but the sides draw inwardly, as shown with dotted lines 10a. In this case support environment 42 may include a solid encapsulation of the object which can be dissolved, melted, etched, or otherwise removed after the product is formed.

Figure 4:
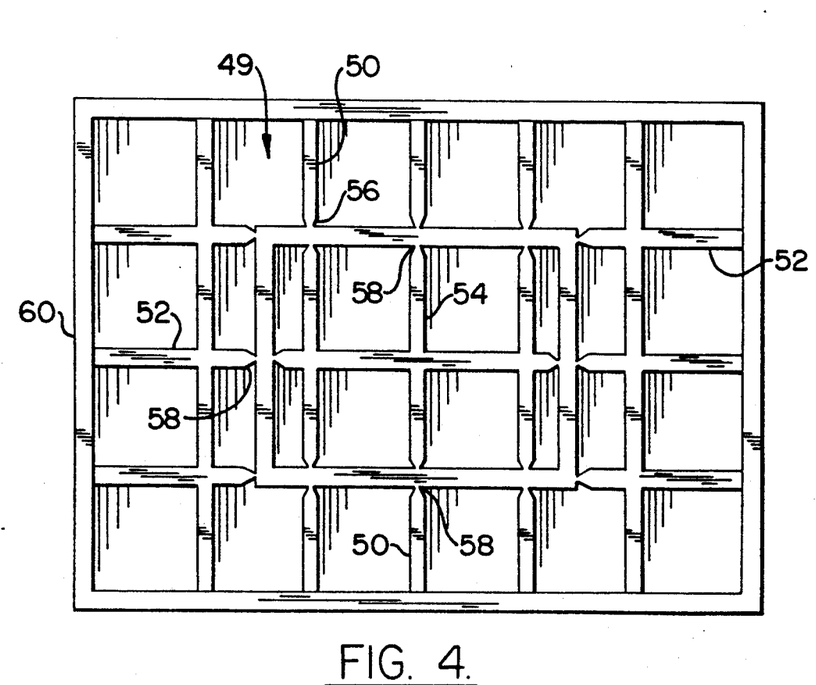
FIG. 4 is a top plan view of an alternate embodiment for providing a physical support environment for reducing warpage and dimensional distortion of objects formed in accordance with the present invention.
Figure 5:
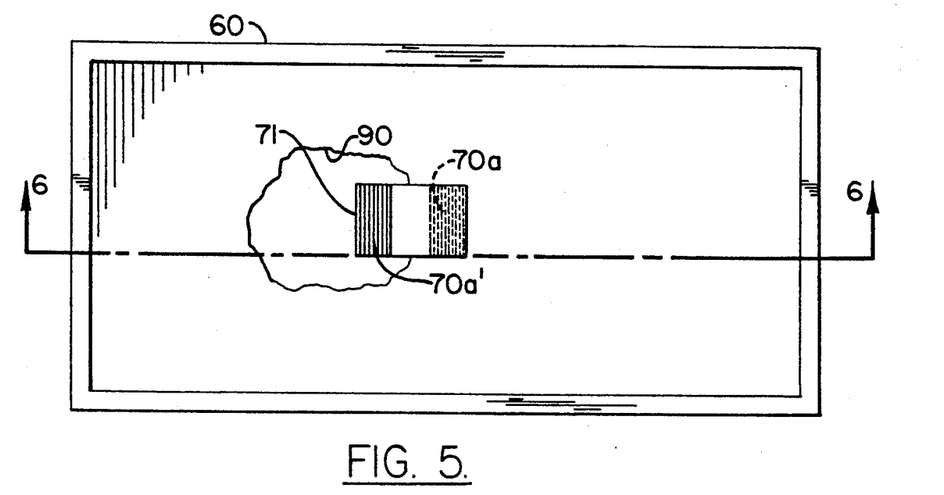
FIG. 5 is a top plan view illustrating the system and method according to the present invention.
Figure 6:
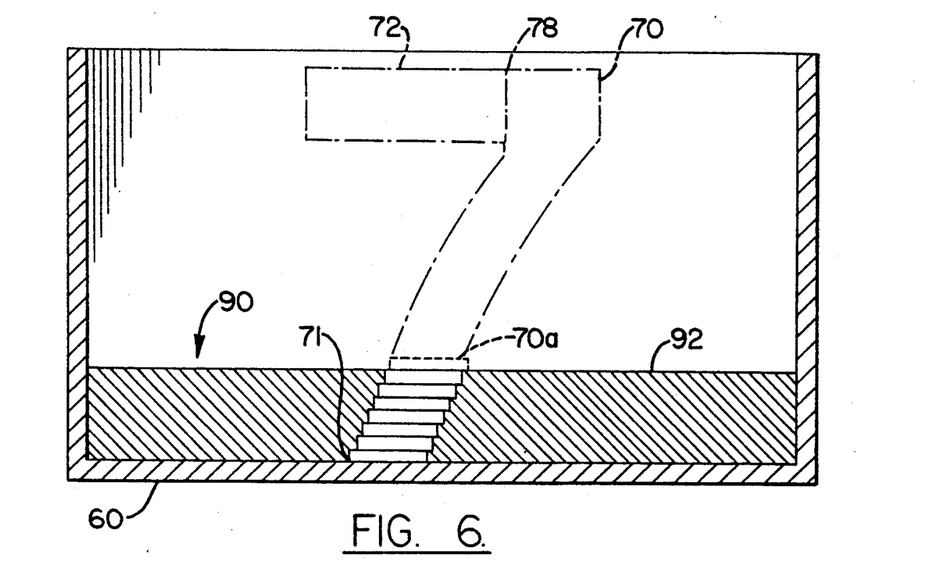
FIG. 6 is a sectional view taken along line 6—6 of FIG. 5.

Another particularly advantageous support system 48, can best be seen in FIG. 4. In this case, a plurality of webs 50, 52 are used to contact object 10 at strategic points 58 around its perimeter to prevent the shrinkage illustrated at FIG. 3. In this case, internal webs 54 are also utilized. The edges of the webs may be tapered at 56 so that they may be more easily removed from the object without disconfiguration. The strategic support points 58 at which the object is supported by the webs may be determined at the same time that the design is determined by the computer machine 12. Support control signals are generated and used to develop support control signals 22b for servo 22.

In the case of the support environment of FIGS. 2, 3, and 4, it will be noted that a support chamber 60 is utilized in either case and that object 10 is formed inside the chamber as is the support environment. Of course, other arrangements may be had for arranging, constructing, and forming the object and support environment. The support material may be any suitable material, for example, a hot wax may be utilized which may be melted away after the object is formed, much like an investment casting process. The encapsulation process will follow a plane-by-plane build up of the part itself as well as the support environment. As each layer of the part is built up, so is the encapsulation. In this manner, the layers of the objects are locked in place as the object is formed to greatly reduce warpage.

Referring now to FIGS. 5-8, another object is shown to illustrate the principles of the system of the present invention. In this case, a numeral 7 is illustrated as being formed. It is to be understood that this numeral may be formed by any of the methods and systems described previously such as ballistic particles and continuous strand methods and systems. The same is true for the support environment. The numeral 7, which is designated as object 70, has a cantilevered off-set 72. As a particular example, a water faucet would have a similar cantilevered off-set. Construction of object 70 begins at the origin 71. As an example, the numeral "7" may be 1½ inches wide, 3 inches in height, with a 1½ inch off-set. At origin 71, the first layer or particle is attached by adhesion and the material does not sag significantly until a point 74 is reached on the numeral. A three-dimensional support environment is provided by a column 76 affixed to base 71 to support object 70 at strategic support point 74 until the object builds to another point that would cause the object to sag and then another column could be added. At point 78, another structural problem is present. As the object is built from this point, the cantilevered off-set portion becomes a major factor in dimensional distortion. At this point, the support environment may include further separate columns, or a web. As illustrated, a web 80 is utilized which extends between different support points on the object itself. The web is a thin layer of support material. If the support material and the object are the same, then the materials may be separated by cutting or breaking after object formation. Alternately, the thin web or column could be of a different material and act as a mold release.

Figure 7:
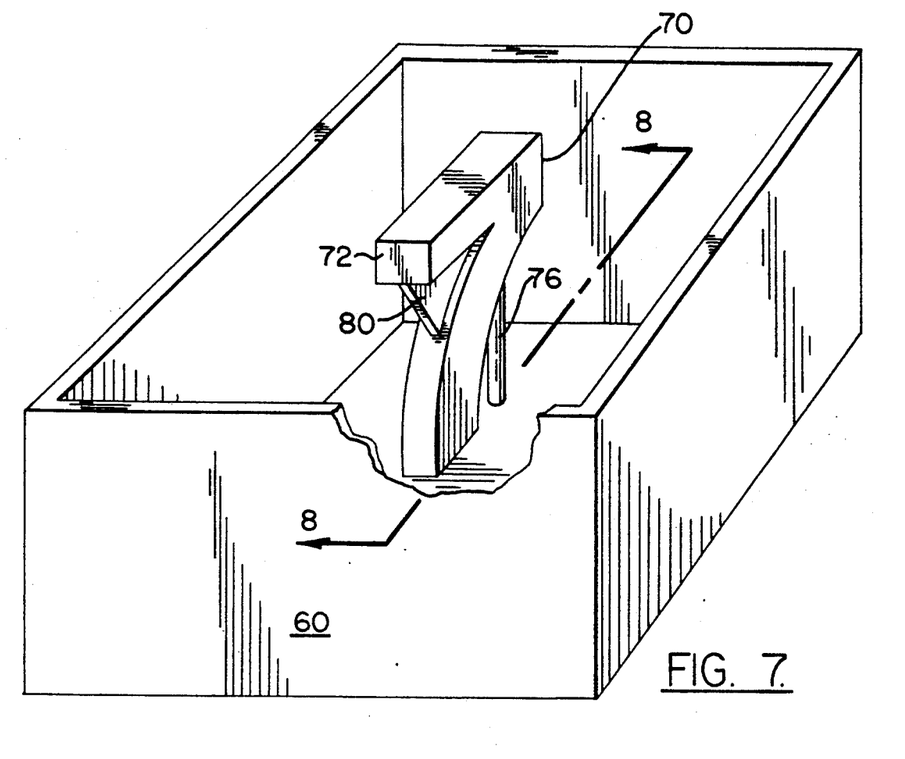
FIG. 7 is a perspective view with parts cut away illustrating a three-dimensional support environment for producing a dimensionally accurate three-dimensional object from a design generated on a computer machine in accordance with the method and system of the present invention.
Figure 8:
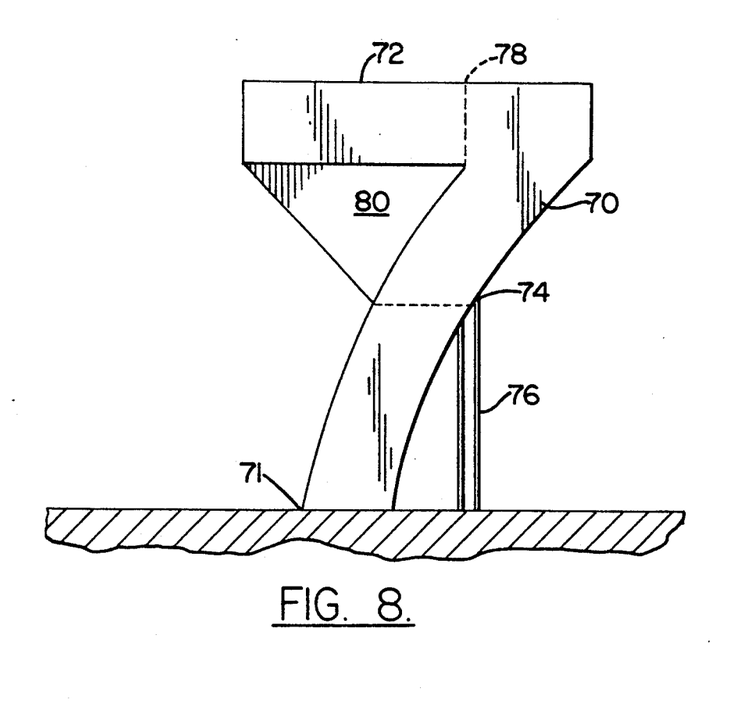
FIG. 8 is an elevation illustrating the system nd method for producing a dimensionally accurate object in accordance with the present invention.

Alternately, object 70 may be encapsulated by a support environment designated 90 within support chamber 60. As object 70 is formed by successive layers 70a, encapsulated material 90 may be built up to support the object. In this case, the material for building object 70 may be any curable polymeric material. Material 90 may be any suitable material such as a hot melt wax, or other material that may be dissolved, melted, or otherwise removed.

It can thus be seen that an advantageous method and system can be had for constructing a three-dimensional object and support environment whose design is created on a computer machine. Control signals for the object and support control signals for the support environment may be simultaneously generated on a computer machine and used to control servos and material forming heads to construct the object and support environment to reduce dimensional distortion in the object shape.

While a preferred embodiment of the invention has been described using specific terms, such description is for illustrative purposes only, and it is to be understood that changes and variations may be made without departing from the spirit or scope of the following claims.

What is claimed is:

1. A method of producing a three-dimensional object from a three-dimensional design generated on a computer machine wherein said object is dimensionally accurate, said object having at least a portion which includes a hollow interior, said method comprising the steps of:
    generating control signals specifying coordinate points of said there-dimensional object in a prescribed coordinate system;
    providing an object material from which said object is formed;
    providing a support material;
    controlling a reaction of said object material at said coordinate points in response to said control signals to form said object in said coordinate system;
    dispensing said support material at least within said hollow interior;
    simultaneously forming a three-dimensional structural support environment from said support material which physically supports said object in situ as said object is being formed; and
    wherein one of said object material and said support material is dispensed as mass particles while the other is dispensed as a fluent strand.

2. The method of claim 1 including forming said support environment by encapsulating said object with said support material as said object is being formed.

3. The method of claim 2 including forming said object in a chamber, and forming said support environment with said chamber by surrounding said object with said support material in said chamber.

4. The method of claim 1 including forming said support environment by surrounding an exterior of said object with said support material while filling said interior of said object with said support material.

5. The method of claim 1 including forming said support environment by forming thin support webs which contact said object at spaced support points.

6. The method of claim 1 including forming said support environment by forming separate columns which support said object at said support points.

7. The method of claim 1 including forming said support environment by supporting said object with a web extending between plural support points on said objects.

8. The method of claim 1 including:
    generating support control signals specifying coordinate support points which correspond to coordinate points for physically supporting said object while it is being formed to reduce warpage and the like of said object; and
    forming said three-dimensional support environment in response to said support control signals for physically supporting said object at said support points while forming said object.

9. The method of claim 1 including forming said support environment by the steps of:
    generating support coordinate points at which it is desired to support said object;
    controlling a working head for directing movement of mass particles of said support material to said support coordinate points;
    controlling said working head in response to said support control signals for directing said mass particles to said support points; and
    joining said mass particles with one another at said coordinate points to form said support environment.

10. The method of claim 1 including:
    generating support coordinate points at which it is desired to support said object as it is formed for accurate formation;
    forming said support environment at said support coordinate points by dispensing a fluent material in a fluent state in response to said support control signals and treating said fluent material after dispensing in controlled relation to said dispensing of said material which set said fluent material in a fixed physical state to support said object during formation.

11. A system for producing a three-dimensional object from a three-dimensional design generated on a computer machine having improved dimensional accuracy, said object having at least a portion which includes a hollow interior, said system comprising:
    means for generating control signals specifying coordinate points of said three-dimensional object;
    a source of object material from which said object is formed;
    control means receiving said control signals for controlling a reaction of said object material at said coordinate points to form said object in three dimensions form said object material in response to said first control signals;
    a source of support material;
    dispensing means disposed in spaced proximity relative to said object for depositing said support material from said dispensing means to said object being formed; and
    support control means for controlling said dispensing means to form a three-dimensional structural support environment physically supporting said object including said hollow interior in situ as said object is being formed, said structural support environment including plural webs supporting said object at plural support points and wherein said webs include tapered edges contacting said object facilitating separation of said web and object.

12. A method for producing a three-dimensional object which ash been designed on a computer machine of the type which comprises generating control signals specifying three-dimensional coordinate points of said object in a prescribed coordinate system, said method comprising the steps of:

provi­ding a source of object material from which said object is formed;

directing quantities of said object material to said three-dimensional coordinate points in response to said control signals to form said object by building said object material upon itself by dispensing a strand of object material in a fluent state in response to said control signals and treating said material after dispensing in controlled relation to said dispensing of said material and subjecting said material to a transition to a fixed physical state in which said material is set in a form of a three-dimensional object;

providing a source of support material, dispensing and directing said support material from above a plane in which said object is being formed toward said object, independently but in controlled relation to said object material; and simultaneously forming a three-dimensional support structure from said support material which physically supports said object in situ during formation of said object.

13. A process for automatically manufacturing a three-dimensional object which has been designed on a computer machine comprising:

generating control signals specifying the coordinate points of said three dimensional design generated by said computer machine;

dispensing a strand of material in a fluent physical state in response to said control signals;

treating said strand of material generally simultaneously as it is dispensed in controlled relation to said dispensing of said fluid material to cause said material to undergo a transition to a fixed, physical state in which said material is set in a form of said three dimensional object; and simultaneously forming a three-dimensional structural support environment which physically supports said object in situ during formation of said object to reduce warpage and dimensional distortion of said object.

14. The process of claim 13 dispensing said strand of material while supported on a base means; and indexing the relative positions of said dispensing means and base means so that strands are caused to build upon one another to construct said three dimensional object.

15. The process of claim 13 including dispensing said material by extruding a generally continuous strand of said material.

16. The process of claim 13 including treating said dispensed material by focusing a beam of radiation upon said fluid material after said material is dispensed to solidify said material.

17. The process of claim 16 including shielding said dispensing means from said energy beam in a controlled manner so that said energy beam acts upon said fluid material at a prescribed position, intensity, and time so as to cause said material to solidify and accurately construct said three dimensional object.

18. A system for producing a three-dimensional object from a three-dimensional design generated on a computer machine having improved dimensional accuracy comprising:

means for generating control signals specifying the three-dimensional coordinate points of said object in a prescribed coordinate system;

a source of object material from which said object is formed;

at least one working head for directing said object material from said working head to said coordinate points;

control means for controlling said working head to direct said object material to said three-dimensional coordinate points in response to said control signals to form said object;

a source of support material;

support material dispensing means disposed in spaced proximity above said object being formed for dispensing said support material about said object so as to form a three-dimensional structural support environment constructed about said object as said object is being formed for physically supporting said object during formation; and wherein one of said working head and said support material dispensing means includes means for dispensing material as mass particles while the other of said working head and said support material dispensing means includes means for dispensing material as a fluent strand.

19. The system of claim 18 including a chamber in which said object is formed, a source of support material, and wherein said support environment includes said support material encapsulating said object in said chamber.

20. The system of claim 19 wherein said support environment includes said support material surrounding an exterior of said object and occupying at least a hollow interior of said object 21. The system of claim 18 wherein said support environment includes at least one web extending between spaced support points on said object.

22. The system of claim 18 wherein said support environment includes at least one column supporting said object at a support point.

23. The system of claim 18 wherein said support environment includes plural webs supporting said object at plural support points.

24. The system of claim 23 wherein said webs include tapered edges contacting said object facilitating separation of said web and object.

25. The system of claim 18 wherein said working head directs a plurality of mass particles to said coordinate points.

26. The system of claim 18 wherein said working head dispenses a continuous strand of fluent object material to form said object, and including treatment means for treating said fluid material as it is dispensed to set said material in the form of said object.

* * * * *